United States Patent
Black et al.

(10) Patent No.: US 9,949,210 B2
(45) Date of Patent: *Apr. 17, 2018

(54) REMEDYING POWER DRAIN VIA A COVERAGE MAP

(71) Applicant: Google Technology Holdings LLC, Mountain View, CA (US)

(72) Inventors: Gregory R. Black, Vernon Hills, IL (US); Timothy M. McCune, Mundelein, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,579

(22) Filed: Mar. 9, 2017

(65) Prior Publication Data

US 2017/0188309 A1    Jun. 29, 2017

Related U.S. Application Data

(63) Continuation of application No. 14/457,190, filed on Aug. 12, 2014, now Pat. No. 9,596,653.

(Continued)

(51) Int. Cl.
*H04W 52/02* (2009.01)
*H04W 64/00* (2009.01)
(Continued)

(52) U.S. Cl.
CPC ....... *H04W 52/0258* (2013.01); *H04L 41/145* (2013.01); *H04L 43/04* (2013.01);
(Continued)

(58) Field of Classification Search
CPC ... H04W 52/0258; H04W 64/00; H04W 4/02; H04W 52/0251; H04W 16/18;
(Continued)

(56) References Cited

U.S. PATENT DOCUMENTS 2,499,663 A    3/1950 Medlar
2,529,038 A    11/1950 Medlar et al.
(Continued)

FOREIGN PATENT DOCUMENTS

DE    10118189    11/2002
EP    1298809    4/2003
(Continued)

OTHER PUBLICATIONS

"Non-Final Office Action", U.S. Appl. No. 14/293,182, dated May 4, 2017, 13 pages.
(Continued)

*Primary Examiner* — Hirdepal Singh
(74) *Attorney, Agent, or Firm* — Colby Nipper

(57) ABSTRACT

A system and method for managing mobile communications device connectivity and communication behavior monitor device location relative to known communication-mode coverage areas and cause or suggest changes in device connectivity or behavior based on a power-drain map to preserve device battery power. The power-drain map provides, in an embodiment, a pairing of locations, available communication modes, and expected power drains when a given device employs each available communication mode. In general, behavioral modifications include preemptive or delayed downloading as well as switching networks or network types among other types of behavior.

20 Claims, 5 Drawing Sheets

Related U.S. Application Data

(60) Provisional application No. 61/916,473, filed on Dec. 16, 2013.

(51) Int. Cl.
*H04L 12/26* (2006.01)
*H04W 16/18* (2009.01)
*H04L 12/24* (2006.01)
*H04W 84/12* (2009.01)

(52) U.S. Cl.
CPC ........... *H04W 16/18* (2013.01); *H04W 64/00* (2013.01); *H04W 84/12* (2013.01)

(58) Field of Classification Search
CPC ....... H04W 84/12; H04W 4/028; H04W 4/04; H04W 4/12; Y02B 60/50; H04L 41/145; H04L 43/04
USPC ...................................... 455/456.3
See application file for complete search history.

(56) References Cited

U.S. PATENT DOCUMENTS

| | | | |
|---|---|---|---|
| 2,563,234 A | 8/1951 | Godshalk et al. |
| 2,627,060 A | 1/1953 | Berg |
| 2,637,836 A | 5/1953 | Kendall et al. |
| 3,678,363 A | 7/1972 | Ringle |
| 4,061,956 A | 12/1977 | Brown et al. |
| 4,082,097 A | 4/1978 | Mann et al. |
| 4,629,965 A | 12/1986 | Fallon et al. |
| 4,649,333 A | 3/1987 | Moore |
| 4,692,682 A | 9/1987 | Lane et al. |
| 4,712,055 A | 12/1987 | Houser, Jr. |
| 4,727,306 A | 2/1988 | Misak et al. |
| 4,745,349 A | 5/1988 | Palanisamy et al. |
| 5,012,176 A | 4/1991 | LaForge |
| 5,136,231 A | 8/1992 | Faulk |
| 5,166,596 A | 11/1992 | Goedken |
| 5,172,044 A | 12/1992 | Sasaki et al. |
| 5,179,335 A | 1/1993 | Nor |
| 5,185,566 A | 2/1993 | Goedken |
| 5,363,031 A | 11/1994 | Miller et al. |
| 5,481,175 A | 1/1996 | Qualich et al. |
| 5,504,416 A | 4/1996 | Holloway et al. |
| 5,523,667 A | 6/1996 | Feldstein |
| 5,600,230 A | 2/1997 | Dunstan |
| 5,640,059 A | 6/1997 | Kammiller et al. |
| 5,656,920 A | 8/1997 | Cherng et al. |
| 5,731,694 A | 3/1998 | Wilcox et al. |
| 5,736,834 A | 4/1998 | Kuno |
| 5,804,944 A | 9/1998 | Alberkrack et al. |
| 5,815,389 A | 9/1998 | Plow et al. |
| 5,900,718 A | 5/1999 | Tsenter |
| 6,094,033 A | 7/2000 | Ding et al. |
| 6,144,186 A | 11/2000 | Thadiwe et al. |
| 6,236,189 B1 | 5/2001 | Franke |
| 6,275,006 B1 | 8/2001 | Kolke et al. |
| 6,298,233 B1 | 10/2001 | Souissi |
| 6,330,455 B1 | 12/2001 | Ichihara |
| 6,470,003 B1 | 10/2002 | Smith et al. |
| 6,495,992 B1 | 12/2002 | Pavlovic |
| 6,639,462 B1 | 10/2003 | Luu |
| 6,771,051 B2 | 8/2004 | Oglesbee et al. |
| 6,803,746 B2 | 10/2004 | Aker et al. |
| 6,850,040 B2 | 2/2005 | Xiong et al. |
| 6,917,182 B2 | 7/2005 | Burton et al. |
| 6,927,555 B2 | 8/2005 | Johnson |
| 7,146,139 B2 | 12/2006 | Nevermann |
| 7,151,411 B2 | 12/2006 | Martin et al. |
| 7,158,804 B2 | 1/2007 | Kumaran et al. |
| 7,170,341 B2 | 1/2007 | Conrad et al. |
| 7,301,308 B2 | 11/2007 | Aker et al. |
| 7,549,177 B2 | 6/2009 | Diefenbaugh et al. |
| 7,724,194 B2 | 5/2010 | Black et al. |
| 8,013,674 B2 | 9/2011 | Drogi et al. |
| 8,054,039 B2 | 11/2011 | Bauerle et al. |
| 8,155,081 B1 | 4/2012 | Mater et al. |
| 8,204,446 B2 | 6/2012 | Scheer et al. |
| 8,232,685 B2 | 7/2012 | Perper et al. |
| 8,269,467 B2 | 9/2012 | Li et al. |
| 8,278,871 B2 | 10/2012 | Kallmyer |
| 8,288,994 B2 | 10/2012 | Jakes et al. |
| 8,427,011 B2 | 4/2013 | Jung et al. |
| 8,436,492 B2 | 5/2013 | Jung et al. |
| 8,538,428 B2 | 9/2013 | Bartlett |
| 8,552,593 B2 | 10/2013 | Jung et al. |
| 8,552,693 B2 | 10/2013 | Paryani |
| 8,592,065 B2 | 11/2013 | Bhardwaj et al. |
| 8,624,546 B2 | 1/2014 | Jung et al. |
| 8,643,342 B2 | 2/2014 | Mehta et al. |
| 8,754,614 B2 | 6/2014 | Paryani et al. |
| 8,760,010 B2 | 6/2014 | Jung et al. |
| 8,805,764 B1 | 8/2014 | Rhines et al. |
| 9,246,454 B2 | 1/2016 | Schirmann et al. |
| 9,356,461 B2 | 5/2016 | Howard et al. |
| 9,419,457 B2 | 8/2016 | Robinson et al. |
| 9,438,293 B2 | 9/2016 | Slater et al. |
| 9,472,965 B2 | 10/2016 | Nilles |
| 9,491,706 B2 | 11/2016 | Thorson et al. |
| 9,596,653 B2 | 3/2017 | Black et al. |
| 9,847,661 B2 | 12/2017 | Nilles |
| 2001/0017602 A1 | 8/2001 | Hieb |
| 2003/0085684 A1 | 5/2003 | Tsukamoto et al. |
| 2003/0189417 A1 | 10/2003 | Dias et al. |
| 2003/0228875 A1 | 12/2003 | Alapuranen |
| 2003/0228891 A1 | 12/2003 | Kobayashi et al. |
| 2004/0075494 A1 | 4/2004 | Klomsdorf et al. |
| 2004/0117330 A1 | 6/2004 | Ehlers et al. |
| 2004/0176125 A1 | 9/2004 | Lee |
| 2004/0222769 A1 | 11/2004 | Al-Anbuky et al. |
| 2004/0257040 A1 | 12/2004 | Xiong et al. |
| 2005/0017677 A1 | 1/2005 | Burton et al. |
| 2005/0030094 A1 | 2/2005 | Conrad et al. |
| 2005/0046387 A1 | 3/2005 | Aker et al. |
| 2005/0168193 A1 | 8/2005 | Xiong et al. |
| 2005/0253561 A1 | 11/2005 | Tibbs |
| 2006/0028176 A1 | 2/2006 | Tang et al. |
| 2006/0158156 A1 | 7/2006 | Gamboa |
| 2006/0269835 A1 | 11/2006 | Song |
| 2007/0069735 A1 | 3/2007 | Graf et al. |
| 2007/0188139 A1 | 8/2007 | Hussain et al. |
| 2008/0074084 A1 | 3/2008 | Lee et al. |
| 2008/0154624 A1 | 6/2008 | O'Neil |
| 2008/0197711 A1 | 8/2008 | Kato et al. |
| 2008/0211455 A1 | 9/2008 | Park et al. |
| 2008/0303480 A1 | 12/2008 | Prutchi et al. |
| 2009/0102294 A1 | 4/2009 | Hodges et al. |
| 2009/0131074 A1 | 5/2009 | Minier |
| 2009/0206797 A1 | 8/2009 | Chueh et al. |
| 2009/0295226 A1 | 12/2009 | Hodges et al. |
| 2009/0305121 A1 | 12/2009 | Yoon et al. |
| 2010/0033138 A1 | 2/2010 | Alger et al. |
| 2010/0085010 A1 | 4/2010 | Suzuki et al. |
| 2010/0127666 A1 | 5/2010 | Ball |
| 2010/0127889 A1 | 5/2010 | Vogel et al. |
| 2010/0156355 A1 | 6/2010 | Bauerle et al. |
| 2010/0198423 A1 | 8/2010 | Hirst |
| 2010/0198713 A1 | 8/2010 | Forbes et al. |
| 2010/0225272 A1 | 9/2010 | Kirby et al. |
| 2010/0233989 A1 | 9/2010 | Constien et al. |
| 2010/0266066 A1 | 10/2010 | Takahashi |
| 2010/0283691 A1 | 11/2010 | Su et al. |
| 2011/0012562 A1 | 1/2011 | Paryani |
| 2011/0018346 A1 | 1/2011 | Dixon |
| 2011/0037439 A1 | 2/2011 | Bhardwaj et al. |
| 2011/0070848 A1 | 3/2011 | Reddy |
| 2011/0071597 A1 | 3/2011 | Aghassian |
| 2011/0090126 A1 | 4/2011 | Szini et al. |
| 2011/0119005 A1 | 5/2011 | Majima et al. |
| 2011/0121836 A1 | 5/2011 | Kim et al. |
| 2011/0140538 A1 | 6/2011 | Jung et al. |
| 2011/0151942 A1 | 6/2011 | Hanley et al. |
| 2011/0156661 A1 | 6/2011 | Mehta et al. |

(56) References Cited

U.S. PATENT DOCUMENTS

| | | | |
|---|---|---|---|
| 2011/0222469 A1 | 9/2011 | Ali et al. | |
| 2011/0275369 A1 | 11/2011 | Bartlett et al. | |
| 2011/0291619 A1 | 12/2011 | Asakura | |
| 2011/0316475 A1 | 12/2011 | Jung et al. | |
| 2012/0021800 A1 | 1/2012 | Wilson et al. | |
| 2012/0032646 A1 | 2/2012 | Lee | |
| 2012/0071195 A1 | 3/2012 | Chakraborty et al. | |
| 2012/0146576 A1 | 6/2012 | Partovi | |
| 2012/0147801 A1 | 6/2012 | Ho et al. | |
| 2012/0210325 A1 | 8/2012 | de Lind van Wijngaarden et al. | |
| 2012/0213172 A1 | 8/2012 | Kim et al. | |
| 2012/0235636 A1 | 9/2012 | Partovi | |
| 2012/0242906 A1 | 9/2012 | Shintani et al. | |
| 2013/0020862 A1 | 1/2013 | Miller | |
| 2013/0069658 A1 | 3/2013 | Rich et al. | |
| 2013/0121194 A1 | 5/2013 | Heshmati | |
| 2013/0122827 A1 | 5/2013 | Ali et al. | |
| 2013/0169348 A1 | 7/2013 | Shi | |
| 2013/0237254 A1 | 9/2013 | Papakipos et al. | |
| 2013/0249479 A1 | 9/2013 | Partovi | |
| 2013/0257359 A1 | 10/2013 | Sakai et al. | |
| 2014/0018077 A1* | 1/2014 | Zhong | H04W 52/0206 455/436 |
| 2014/0068288 A1 | 3/2014 | Robinson et al. | |
| 2014/0070761 A1 | 3/2014 | Labbe et al. | |
| 2014/0070762 A1 | 3/2014 | Jenwatanavet et al. | |
| 2014/0084856 A1 | 3/2014 | Howard et al. | |
| 2014/0092243 A1 | 4/2014 | Ichikawa | |
| 2014/0097671 A1 | 4/2014 | Nakamura et al. | |
| 2014/0176067 A1 | 6/2014 | Suzuki et al. | |
| 2014/0232330 A1 | 8/2014 | Robertson et al. | |
| 2014/0253023 A1 | 9/2014 | Paryani | |
| 2014/0266462 A1 | 9/2014 | Schirmann et al. | |
| 2014/0274188 A1 | 9/2014 | Thorson et al. | |
| 2015/0063181 A1 | 3/2015 | Haro et al. | |
| 2015/0064528 A1 | 3/2015 | Liu et al. | |
| 2015/0079933 A1* | 3/2015 | Smith | H04W 4/02 455/411 |
| 2015/0092676 A1 | 4/2015 | Periyalwar et al. | |
| 2015/0170496 A1* | 6/2015 | King | G08B 21/24 340/686.6 |
| 2015/0234054 A1* | 8/2015 | Lennen | G01S 19/34 342/357.74 |
| 2015/0236800 A1 | 8/2015 | Tipton et al. | |
| 2015/0349372 A1 | 12/2015 | Maleki et al. | |
| 2015/0358851 A1 | 12/2015 | Toda | |
| 2015/0379533 A1 | 12/2015 | Alberth et al. | |
| 2016/0043752 A1 | 2/2016 | Slater et al. | |
| 2016/0072326 A1 | 3/2016 | Nilles | |
| 2016/0100364 A1* | 4/2016 | Bitar | H04W 52/0225 455/456.2 |
| 2017/0033584 A1 | 2/2017 | Nilles | |

FOREIGN PATENT DOCUMENTS

| | | |
|---|---|---|
| EP | 1505725 | 7/2009 |
| EP | 2077682 | 7/2009 |
| EP | 2222371 | 5/2011 |
| EP | 2595269 | 5/2013 |
| JP | H09247852 | 9/1997 |
| JP | 2003333200 | 11/2003 |
| WO | WO-9306682 | 4/1993 |
| WO | WO-2011084367 | 7/2011 |
| WO | WO-2011090769 | 7/2011 |
| WO | WO-2013152149 | 10/2013 |

OTHER PUBLICATIONS

"Non-Final Office Action", U.S. Appl. No. 15/295,929, dated Jun. 2, 2017, 7 pages.

"3GTPP TS 36.213 V9.3.0 3rd Generation Partnership Project Technical Speficiation Group Radio Access Network", Evolved Universal Terrestrial Radio Access (E-UTRA); Physical layer procedures (Release 9), Sep. 2010, 80 pages.

"Corrected Notice of Allowance", U.S. Appl. No. 13/625,976, dated May 4, 2016, 2 pages.

"Corrected Notice of Allowance", U.S. Appl. No. 14/457,190, dated Nov. 14, 2016, 2 pages.

"Corrected Notice of Allowance", U.S. Appl. No. 14/479,679, dated Aug. 3, 2016, 2 pages.

"Corrected Notice of Allowance", U.S. Appl. No. 14/479,679, dated Sep. 21, 2016, 2 pages.

"Ex Parte Quayle Action", U.S. Appl. No. 13/625,976, Dec. 11, 2015, 11 pages.

"Ex Parte Quayle Action", U.S. Appl. No. 14/108,544, Apr. 23, 2015, 8 pages.

"Ex Parte Quayle Action", U.S. Appl. No. 14/451,950, Aug. 4, 2015, 7 pages.

"Final Office Action", U.S. Appl. No. 13/477,609, Jul. 31, 2015, 11 pages.

"Final Office Action", U.S. Appl. No. 13/625,976, dated Jun. 5, 2015, 40 pages.

"Final Office Action", U.S. Appl. No. 13/798,682, dated Jul. 30, 2015, 12 pages.

"Final Office Action", U.S. Appl. No. 14/293,182, dated Sep. 22, 2016, 9 pages.

"Final Office Action", U.S. Appl. No. 14/457,190, dated Mar. 3, 2016, 33 pages.

"First Choice Power", http://www.firstchoicepower.com/plans-services/electricity-plans/variable-rate-electricity-plans.aspx—Retrieved on May 18, 2012, 1 page.

"Foreign Office Action", EP Application No. 13726055.0, dated Nov. 23, 2016, 4 pages.

"How Does Prepaid Electricity Work", http://www.mxenergy.com/does-prepaid-electricity-work-a-19.html—Retrieved on Jan. 15, 2012, 3 pages.

"International Preliminary Report on Patentability", Application No. PCT/US2013/054623, dated Apr. 9, 2015, 12 pages.

"International Preliminary Report on Patentability", Application No. PCT/US2013/060170, dated Mar. 24, 2015, 6 pages.

"International Preliminary Report on Patentability", Application No. PCT/US2013/042042, dated Mar. 10, 2015, 8 pages.

"International Preliminary Report on Patentability", Application No. PCT/US2014/014994, dated Sep. 15, 2015, 8 pages.

"International Search Report and the Written Opinion", Application No. PCT/US2014/070384, dated Mar. 13, 2015, 12 pages.

"International Search Report and the Written Opinion", Application No. PCT/US2014/014994, dated Mar. 21, 2014, 12 pages.

"International Search Report and the Written Opinion", Application No. PCT/US2013/054623, dated May 14, 2014, 14 pages.

"International Search Report and the Written Opinion", Application No. PCT/US2013/040242, dated Oct. 4, 2013, 14 pages.

"International Search Report and the Written Opinion", Application No. PCT/US2014/018479, dated Jul. 22, 2014, 17 pages.

"International Search Report and the Written Opinion", Application No. PCT/US2013/060170, dated Dec. 5, 2013, 8 pages.

"Non-Final Office Action", U.S. Appl. No. 13/477,609, dated Dec. 3, 2014, 7 pages.

"Non-Final Office Action", U.S. Appl. No. 13/477,609, dated Dec. 14, 2015, 9 pages.

"Non-Final Office Action", U.S. Appl. No. 13/621,857, dated Nov. 14, 2014, 5 pages.

"Non-Final Office Action", U.S. Appl. No. 13/625,976, dated Feb. 5, 2015, 38 pages.

"Non-Final Office Action", U.S. Appl. No. 13/798,682, dated Feb. 17, 2015, 10 pages.

"Non-Final Office Action", U.S. Appl. No. 13/798,682, dated Dec. 4, 2015, 13 pages.

"Non-Final Office Action", U.S. Appl. No. 14/293,182, dated May 20, 2016, 10 pages.

"Non-Final Office Action", U.S. Appl. No. 14/457,190, dated Sep. 18, 2015, 25 pages.

"Notice of Allowance", U.S. Appl. No. 13/477,609, dated Apr. 11, 2016, 5 pages.

"Notice of Allowance", U.S. Appl. No. 13/621,857, dated Jan. 26, 2015, 7 pages.

(56) References Cited

OTHER PUBLICATIONS

"Notice of Allowance", U.S. Appl. No. 13/621,857, dated May 11, 2015, 5 pages.
"Notice of Allowance", U.S. Appl. No. 13/625,976, dated Mar. 3, 2016, 8 pages.
"Notice of Allowance", U.S. Appl. No. 13/798,682, dated Jun. 20, 2016, 10 pages.
"Notice of Allowance", U.S. Appl. No. 14/108,544, dated Oct. 15, 2015, 6 pages.
"Notice of Allowance", U.S. Appl. No. 14/451,950, dated Jan. 15, 2016, 5 pages.
"Notice of Allowance", U.S. Appl. No. 14/451,950, dated Apr. 22, 2016, 5 pages.
"Notice of Allowance", U.S. Appl. No. 14/457,190, dated Oct. 31, 2016, 8 pages.
"Notice of Allowance", U.S. Appl. No. 14/479,679, dated Jun. 21, 2016, 9 pages.
"Restriction Requirement", U.S. Appl. No. 13/621,857, dated Aug. 18, 2014, 7 pages.
"Supplemental Notice of Allowance", U.S. Appl. No. 13/477,609, dated Jun. 16, 2016, 2 pages.
"Supplemental Notice of Allowance", U.S. Appl. No. 13/625,976, dated Mar. 24, 2016, 5 pages.
"Supplemental Notice of Allowance", U.S. Appl. No. 14/451,950, dated Jan. 29, 2016, 2 pages.
"Supplemental Notice of Allowance", U.S. Appl. No. 14/451,950, dated Jun. 10, 2016, 2 pages.
"Supplemental Notice of Allowance", U.S. Appl. No. 14/451,950, dated Aug. 3, 2016, 2 pages.
"Supplemental Notice of Allowance", U.S. Appl. No. 14/457,190, dated Feb. 13, 2017, 2 pages.
"Your Choice Your Plan", GreyStone Power Corporation, http://www.greystonepower.com/UploadedFiles/pdf/prepaid%20brochure.pdf—Retrieved on Jun. 4, 2012, 2 pages.
Park,"Energy Maps for Large-scale, Mobile Wireless Networks", IEEE International Conference on Communications, 2007, Jun. 24, 2007, 6 pages.
"Notice of Allowance", U.S. Appl. No. 15/295,929, dated Aug. 16, 2017, 9 pages.
"Notice of Allowance", U.S. Appl. No. 14/293,182, dated Nov. 7, 2017, 10 pages.

* cited by examiner

REMEDYING POWER DRAIN VIA A COVERAGE MAP

RELATED APPLICATIONS

This application is a continuation of and claims priority to U.S. patent application Ser. No. 14/457,190, filed on Aug. 12, 2014, which, in turn, claims priority under 35 U.S.C. § 119(e) to U.S. Provisional Patent Application 61/916,473, filed on Dec. 16, 2013, which is incorporated herein by reference in its entirety.

TECHNICAL FIELD

The present disclosure is related generally to mobile-device power usage and, more particularly, to a system and method for enhancing mobile-device power conservation through network selection.

BACKGROUND

Mobile wireless communication devices such as cellular and other wireless phones, tablets, watches, and so on are ubiquitous in large part because of their mobility. Certainly such devices have extensive capabilities, and these capabilities seem to be constantly increasing. However, a large stationary system will almost always have a greater computing capability than a small mobile device. Thus, the primary benefit of mobile devices remains their mobility.

In this connection, the usable mobility of such devices is directly related to the extent to which wireless communications are available. The availability of wireless communications is sometimes referred to as coverage. An absence of coverage can cause dropped calls, failures to load media or applications, missed messages, and so on. However, not only does coverage affect connectivity, it also directly impacts the power cost of communications. For example, in an area of poor coverage due to a distant base station, the power cost of transmitting over the required distance may be much greater than the power cost would be if the base station were closer.

The present disclosure is directed to a system that may conserve device battery resources by strategic coverage tracking and network selection. However, it should be appreciated that any such benefit is not necessarily a limitation on the scope of the disclosed principles or of the attached claims, except to the extent expressly noted in the claims. Additionally, the discussion of technology in this Background section is merely reflective of inventor observations or considerations and is not intended to be admitted or assumed prior art as to the discussed details. Moreover, the identification of the desirability of a certain course of action is the inventors' observation, not an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
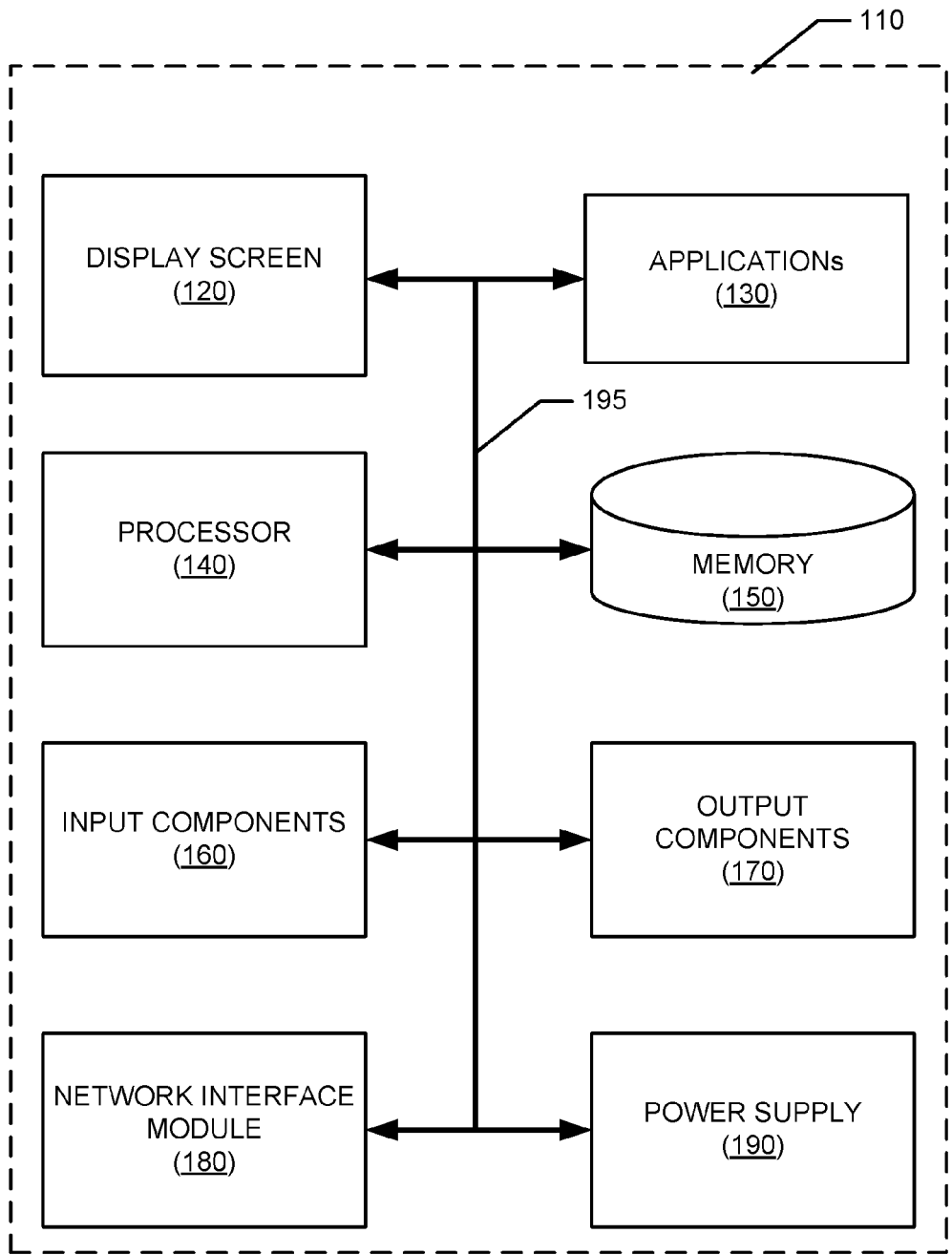
FIG. 1 is a generalized schematic of an example device with respect to which the presently disclosed innovations may be implemented.

Before presenting a detailed discussion of embodiments of the disclosed principles, an overview of certain embodiments is given to aid the reader in approaching the later discussion. As noted above, the quality of wireless connectivity available to a mobile device can affect the power required of the device to engage in wireless communications. To accommodate varying coverage conditions, a wireless device may investigate to determine whether a wireless communication mode different from the one currently being used by the device offers better coverage. If so, the device may switch and start using this alternative communication mode.

The alternative mode may represent an entirely different communication technology. For example, a local WiFi network may provide better connectivity than a cellular network that a mobile device is currently using. Alternatively, the alternative mode may include a different provider of the same technology. For example, a new cellular provider may provide better coverage at the current location than the current cellular provider.

However, searching for better communications modes and frequently switching among communications modes are both energy-intensive processes that consume substantial amounts of battery power on the device. To minimize this power drain, a coverage map may be used to eliminate the need to investigate alternative modes in real time. By noting its own geographical location (e.g., by means of a Global Positioning System ("GPS")) and then referencing an appropriate coverage map, a device is able to select a best communication mode for its present location. The device can then switch to that mode without expending the power to search for alternative modes.

Alternatively, the coverage map can reveal that the mode currently used by the device, though of less than optimal quality, is no worse than the alternatives. This again saves the device from expending the power that would have been needed to independently investigate other available modes in real time, and the device does not switch modes.

In an embodiment of the disclosed principles, coverage maps are generated and provided that take into direct consideration the power needs of different types of devices with different capabilities in different stages of power use. For example, a device that is low on power can consult such a map to determine, given its current battery level, its communications needs, and its current geographic location, what communication mode it should be using. Herein, this type of coverage map is sometimes referred to as a "power-drain map."

In an embodiment, wireless devices collect information to create the coverage map and share collected information with a map server. The coverage map includes information specific to a type of communication device and to each communication mode usable by that type of device in a further embodiment. If a particular communication mode is usable by a device but has been disabled, then the coverage map, as presented to this device, can be altered to remove references to the disabled mode. Alternatively, the user is alerted that this currently disabled mode is preferable to other enabled modes, such that the user may consider enabling this mode.

When a device uses the power-drain map (whether earlier created by itself or retrieved from a map server), it can consult the map informed by its current battery level and communications needs and then apply an appropriate remedy. For example, it might be advisable based on the power-drain map to search for an alternative communication mode. Alternatively, the power-drain map may indicate that no alternative communication mode is viable at this location. The power-drain map may even guide the user of the device to a nearby location with better connectivity or further communication-mode options.

In extreme cases, consulting with the map may lead the device (or its user) to consider turning off data transmission or even all transmission (i.e., by going into airplane mode). On the other hand, the current connectivity may be so good relative to upcoming locations that the device is advised to take advantage of the current connectivity by preemptively downloading as much data as possible before the device leaves the present area of good connectivity.

Regarding the comparison of upcoming locations to the device's current locations, in an embodiment, the device's predicted future location is taken into account when generating current guidance for device communication and connectivity behavior. In one aspect of this behavior, the device's predicted path can be compared against the coverage map to take preemptive action as needed. The preemptive download when in a location having good connectivity is an example of this.

Having considered a high level overview of the disclosed principles and turning now to a more detailed discussion in conjunction with the attached figures, techniques of the present disclosure are illustrated as being implemented in a suitable environment. The following description is based on embodiments of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that many other devices such as but not limited to laptop computers, tablet computers, personal computers, embedded automobile computing systems and so on may also be used.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, cost, and other considerations.

In the illustrated embodiment, the components of the user device 110 include a display screen 120, applications 130, a processor 140, a memory 150, one or more input components 160 such as speech- and text-input facilities, and one or more output components 170 such as text- and audible-output facilities, e.g., one or more speakers.

The one or more input components 160 of the device 110 also include a sensor or system that measures or monitors a condition associated with wireless network connectivity or power drain. The condition may be, for example, power drain per unit time, power drain per unit data during transmission or receipt of data, and the like, sensed parameters such as device orientation relative to the earth, and relative to the user (e.g., pocket location or hand grip), and communication network parameters such as transmission frequency, band or channel grouping, bandwidth allocation, and modulation format. Similarly, the device 110 also includes a sensor configured for determining location of the device such as a GPS module and associated circuitry and software.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random-access memory. Additionally or alternatively, the memory 150 may include a read-only memory (i.e., a hard drive, flash memory, or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer-readable medium (e.g., memory 150) to control basic functions of the electronic device 110. Such functions may include, for example, interaction among various internal components and storage and retrieval of applications and data to and from the memory 150.

The illustrated device 110 also includes a network interface module 180 to provide wireless communications to and from the device 110. The network interface module 180 may include multiple communications interfaces, e.g., for cellular, WiFi, broadband, and other communications. A power supply 190, such as a battery, is included for providing power to the device 110 and its components. In an embodiment, all or some of the internal components communicate with one another by way of one or more shared or dedicated internal communication links 195, such as an internal bus.

Further with respect to the applications, these typically utilize the operating system to provide more specific functionality, such as file-system service and handling of protected and unprotected data stored in the memory 150. Although many applications may govern standard or required functionality of the user device 110, in many cases applications govern optional or specialized functionality, which can be provided, in some cases, by third-party vendors unrelated to the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device, or any of a variety of types of information that are uploaded to, downloaded from, or otherwise accessed at servers or other devices with which the device 110 is in communication during its ongoing operation.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user-interface objects (e.g., toggling through various icons that are linked to executable applications).

As noted above in overview, a mobile communication device such as a mobile phone operating in accordance with an embodiment of the disclosed principles can operate with greater energy efficiency by using a power-drain map. In particular, the device may use the map to more efficiently select communication modes and optionally to predict future communication modes and modify device communication behavior accordingly.

Figure 2:
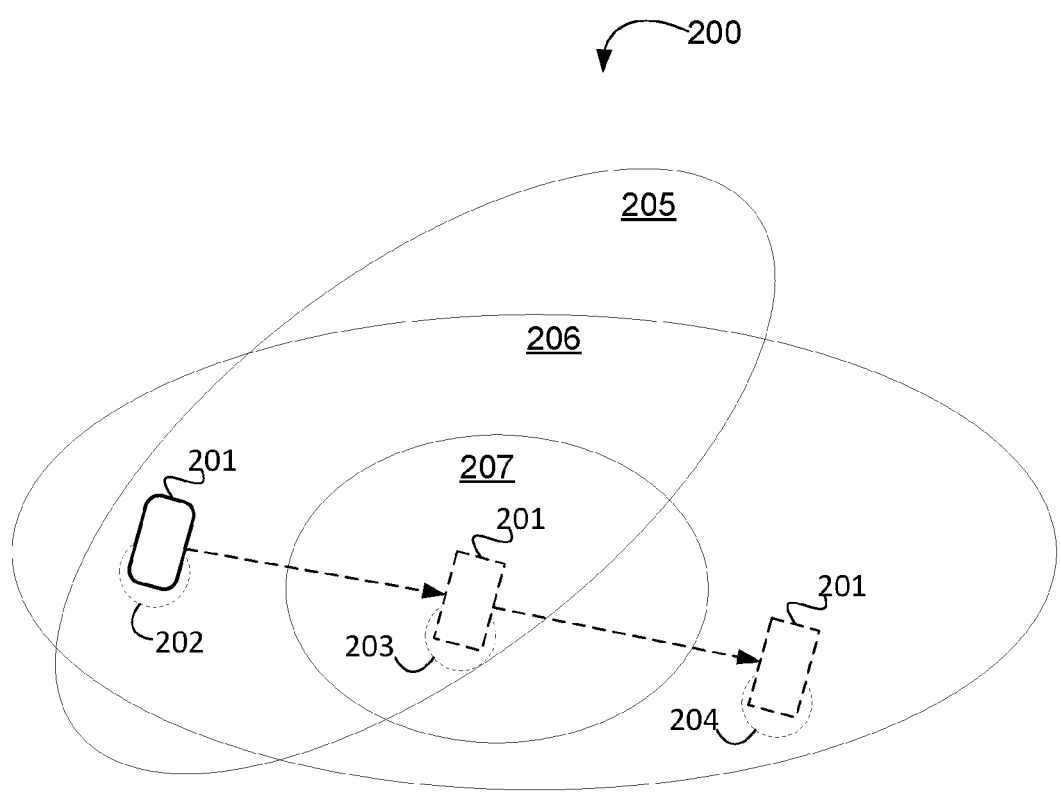
FIG. 2 is a coverage map showing a geographical component of wireless coverage of various communication modes in accordance with various embodiments of the disclosed principles.

Before describing the process flows involved in these techniques, an example network environment is described for common reference later. In particular, the simplified network diagram of FIG. 2 shows an example environment 200 within which an example device 201 is shown to be traveling and operating. As shown, the device 201 is currently (at time $T_0$) in a first position 202, but is predicted to be in a different position 203 at a later time $T_1$ and in yet another position 204 at a still later time $T_2$.

The methodology used to predict the device's motion may include any suitable prediction technique, including techniques based on known routes (e.g., learned user routes or known roads), device long-term history, device trajectory, user-calendar data, and so on.

The illustrated network environment 200 includes network 205, network 206, and network 207. In the example, the coverage areas of all three networks 205, 206, 207 overlap. Moreover, the coverage area of network 207 is entirely contained within the coverage area of network 206 in the illustrated example. As the device 201 traverses the overall area, it is first within the coverage areas of networks 205 and 206, moves into the coverage area of network 207, and then moves out of all coverage areas except that of network 206.

Figure 3:
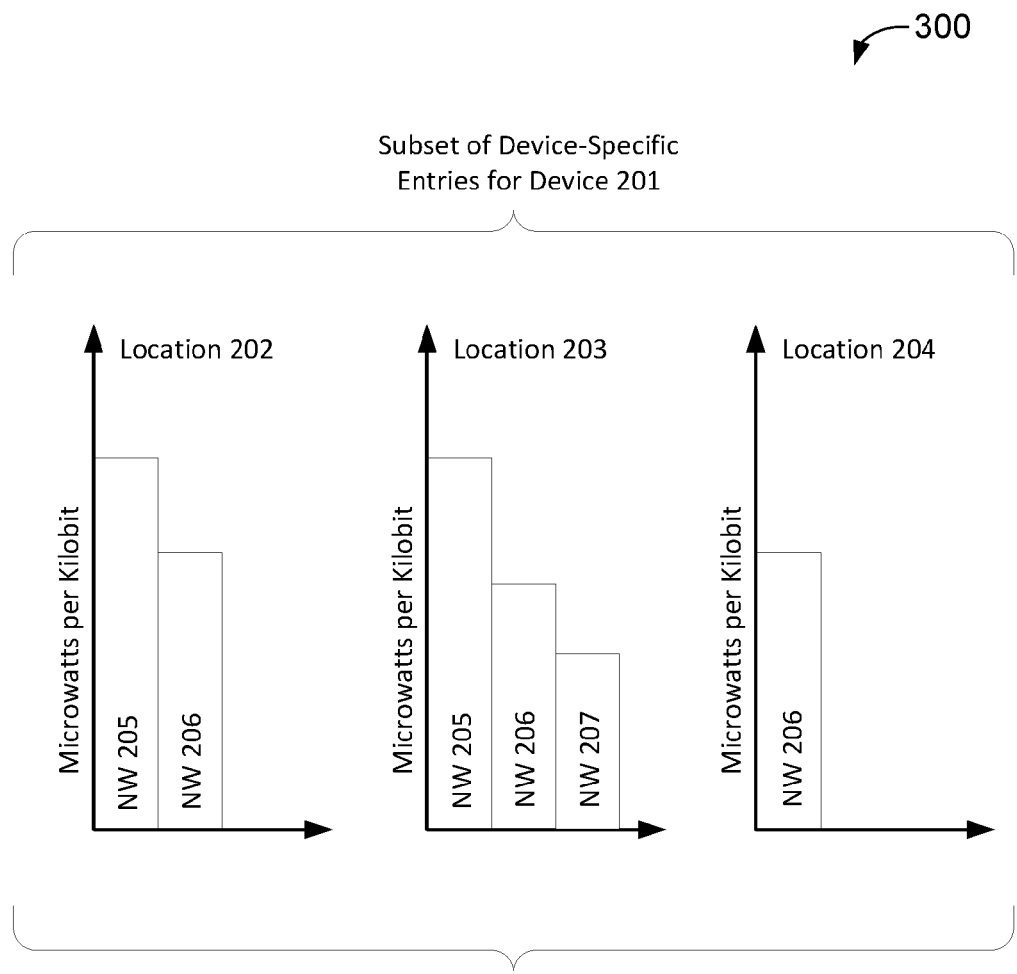
FIG. 3 is an example power-drain map data for a specific device at specific locations in accordance with an embodiment of the disclosed principles.

Given this progression, a series of example power-drain map entries is shown in FIG. 3 corresponding to positions 202, 203 and 204 for device 201. As can be seen, although coverage for network 207 is not initially available, this network 207 provides an attractive option when it becomes available in the second entry. The coverage area for network 207 does not extend far, and for most of its travel, the device 201 is outside of the coverage area of network 207.

Having predicted the illustrated path and retrieved at least the illustrated power-drain map entries, the mobile device 201 may choose to modify its behavior to most efficiently utilize its remaining power. For example, the device 201 (e.g., using a network selection and connection utilization application or routine run by the device processor) may decide to delay a power-intensive download at position 202. Instead, the device may connect to network 207 once at position 203 and execute the needed download or downloads.

In an embodiment, network 207 is of a type that the device 201 supports but that is currently (at position 202) disabled on the device 201. Upon predicting the illustrated path, retrieving the illustrated power-drain map entries, and determining that a download in position 203 will be more power efficient than a download at position 202, the mobile device 201 may enable the network type associated with network 207.

Alternatively, the device 201 may request that the user enable the network type associated with network 207. However, if the device battery level is high, then the device 201 may opt for a less efficient immediate download in the interest of eliminating any delay in the user experience. Thus, the device battery level is also a consideration in determining what remedy to effectuate based on the map data. Other options, alternatives, and variations will become apparent.

In yet another alternative embodiment, if a particular communication mode is usable by a device but has been disabled, then the coverage map, as presented to this device, is altered to remove data for the disabled mode.

The coverage map data such as those shown in FIG. 3 may be retrieved from a coverage map server, e.g., a remote server, or from a local memory. Moreover, the coverage data may be communally created by numerous devices at various times or may be created by the single device in question over time.

When a device uses a power-drain map (whether earlier created by itself or retrieved from a map server), it can consult the map informed by its current battery level and communications needs and then apply an appropriate remedy. For example, it might be advisable based on the power-drain map to search for an alternative communication mode. Alternatively, the power-drain map may indicate that no alternative communication mode is viable at this location. The power-drain map may even guide the user of the device to a nearby location with better connectivity or to further communication mode options.

In extreme cases, consulting with the map may lead the device (or its user) to consider turning off data transmission or even all transmission (i.e., by going into airplane mode). On the other hand, the current connectivity may be so good relative to upcoming locations that the device is advised to take advantage of the current connectivity by preemptively downloading as much data as possible before the device leaves the present area of good connectivity, similar to the delayed download discussed above.

Regarding the comparison of upcoming locations to the device's current locations, in an embodiment, the device's predicted future location is taken into account when generating current guidance for device communication and connectivity behavior. In one aspect of this behavior, the device's predicted path can be compared against the coverage map to take preemptive action as needed. The preemptive download when in a location having good connectivity is an example of this.

Figure 4:
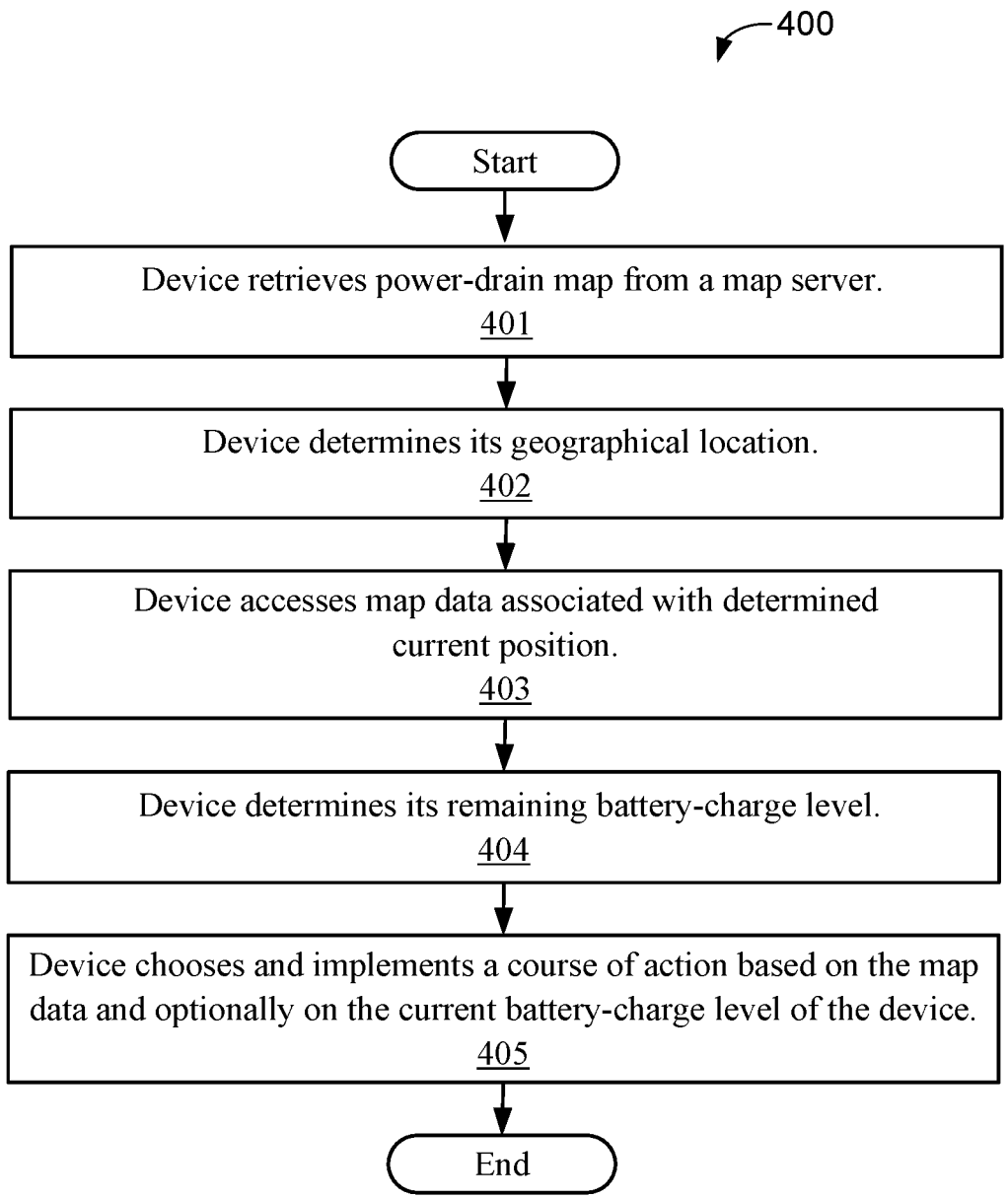
FIG. 4 is a flowchart showing a process for utilizing a power-drain map to improve device efficiency and network behavior in accordance with various embodiments of the disclosed principles.

The flowchart of FIG. 4 illustrates a process 400 for utilizing a power-drain map to improve device efficiency and network behavior. At stage 401 of the process 400, the device, e.g., device 110, 201, retrieves a power-drain map from a map server over a network connection, e.g., a cellular or other network connection. As noted above, the device may alternatively have created the map over time based on data it collected from the current location as well as other locations.

The device determines its geographical location at stage 402. In an embodiment, this step is accomplished via GPS, although it will be appreciated that other methodologies such as WiFi localization may be used.

The device accesses the map data associated with its determined current position at stage 403. In keeping with the foregoing discussion, the map data may show condition data associated with the particular device and the determined position, e.g., an expected power drain associated with each available mode of communication. Modes of communication may include one or more cellular connections, one or more WiFi connections, or one or more other types of connections. Condition data may also include present or predicted network condition data such as operating channel or band and modulation format. Condition data may also include sensor data or conditions inferred from sensor data such as the device orientation with respect to the earth or the device position relative to the body of the user or a user grip. At stage 404, the device determines its remaining battery power, also referred to as battery-charge level.

Based on the map data and optionally on the current battery-charge level of the device, the device chooses and implements a course of action in stage 405. Although certain types of actions were discussed above, a more extensive though not exhaustive listing of options includes altering an interval of scanning for communications modes usable by the device, turning roaming off, disabling switching of communications modes by the device, switching to a different communications mode usable by the device, altering public land mobile network preference thresholds, turning off data reception, preemptively downloading data, and turning on airplane mode. Furthermore, options may include informing the user of potentially advantageous changes in device orientation, position, or grip.

Although the process 400 is described as taking place at the device, it will be appreciated that the process 400 may be executed partially or entirely elsewhere. For example, the map server may execute some or all of the process 400, with the understanding that the device may need to supply its location or data usable to determine its location.

Figure 5:
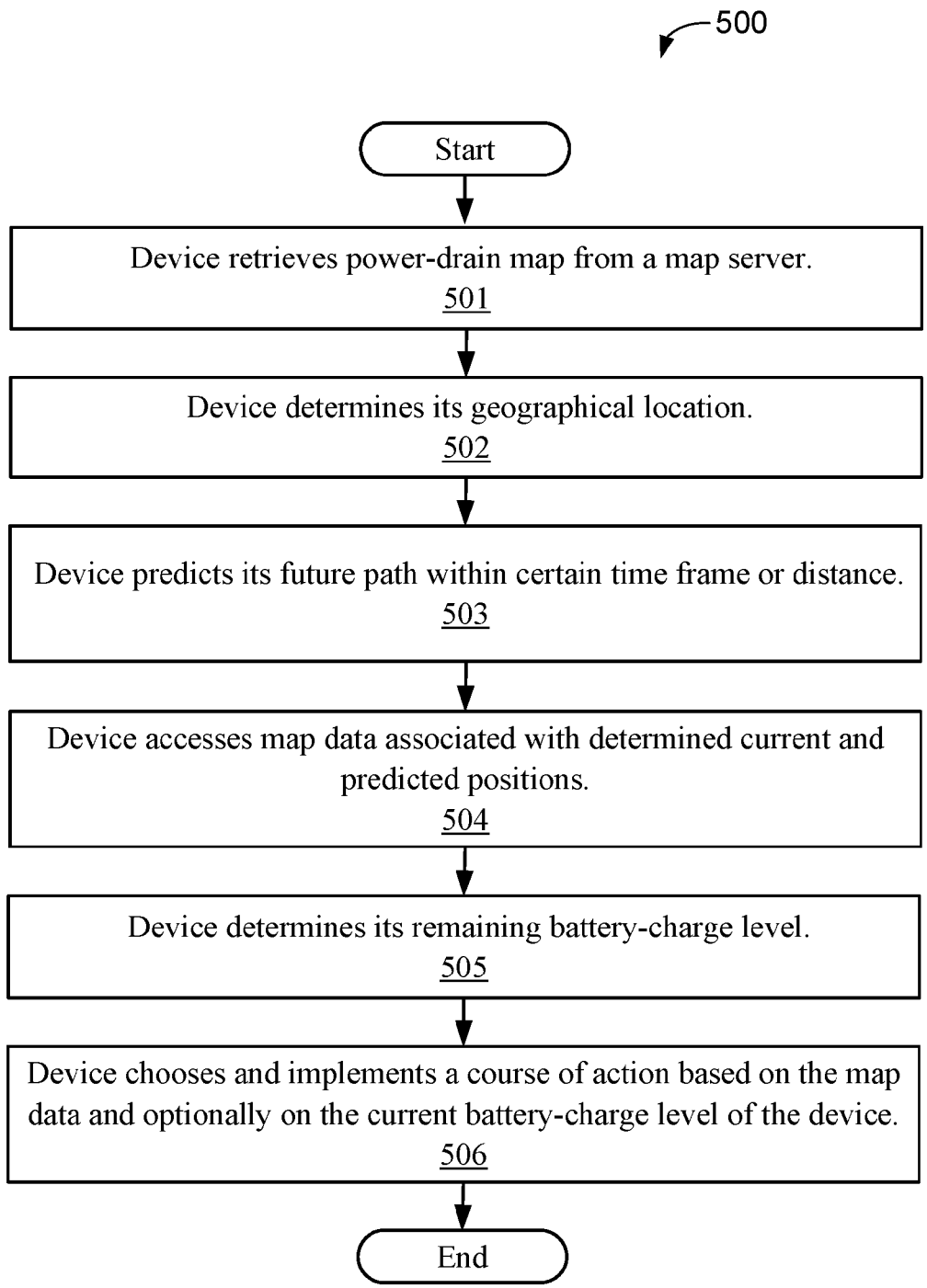
FIG. 5 is a flowchart showing an alternative process for utilizing a power-drain map to improve device efficiency and network behavior in accordance with various embodiments of the disclosed principles.

As noted above, device-path prediction is used as an additional factor in an embodiment of the disclosed principles to determine a course of action for the device. A flowchart of an example process 500 in accordance with such an embodiment is shown in FIG. 5. At stage 501 of the process 500, the device retrieves a power-drain map from a map server over a network connection, e.g., a cellular or other network connection. As noted above, the device may alternatively create the map itself.

The device determines its geographical location at stage 502, e.g., via GPS or other suitable methodology. At stage 503, the device predicts its future path within a certain frame of time or distance. For example, the prediction may be executed for a period of ten minutes or a distance of a quarter mile.

The path prediction may be based on any suitable factors, including, for example, current location of the device, current direction of movement of the device, a geographical map, observations of past behavior of the device, observations of past behavior of a user of the device, stored preferences, observations of a plurality of devices, observations of a plurality of users of devices, a time of day, and a current weather condition. Moreover, the prediction may actually be received from a device distinct from, and perhaps remote from, the wireless communications device itself.

The device accesses the map data associated with its determined current and predicted positions at stage 504. As with the prior embodiment, the device may determine its remaining battery power at stage 505. Based on the map data and optionally the current battery-charge level of the device, the device chooses a path of action in stage 506, choosing and implementing a remedy. Unlike the non-predictive case, options in the predictive case include time-shifting options.

Although the process 500 is described as taking place at the device, it will be appreciated that the process 500 may be executed partially or entirely elsewhere. For example, the map server may execute some or all of the process 500, with the understanding that the device may need to supply its location or data usable to determine its location.

As noted above, the power-drain map may be created by the device or the map server. In the latter case, the map server receives an association of a measured condition (wireless network connectivity or power drain for example) and a geographical location from a wireless communications device. The server progressively builds the power-drain map comprising the associated measured condition and location. The condition may relate to a communication mode usable by the wireless communications device. The condition may relate to the device orientation relative to the earth. The condition may also relate to the device orientation or position relative to a user.

In an embodiment, the map includes conditions and locations for each of a plurality of communication modes usable by wireless communications devices. The map may also include information associated with a model of the wireless communication device. For example, a power-drain model may be applied assuming a linear discharge of the device battery with increasing drain. Similarly, a more complex model may assume additional resistive losses with increased drain.

Although the map server architecture is not critical, in an embodiment, the map server includes a communications interface configured to receive the association of a measured condition and a geographical location, as well as a processor configured to build the map comprising the associated measured condition and geographical location.

In view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A wireless communication device comprising:
  a location sensor;
  a power drain sensor;
  a battery;
  a processor; and
  a memory comprising instructions that configure the wireless communication device to build a power-drain map, the instructions executable by the processor to configure the wireless communication device to:
    determine a current geographical location using the location sensor;
    measure, using the power drain sensor, a power drain associated with wireless connectivity at the current geographical location related to a current communication mode in use by the wireless communication device;
    associate the measured power drain with the current geographical location and the current communication mode; and
    build the power-drain map comprising the measured power drain, the current communication mode, current geographical location, and information associated with a power-drain model for increasing drain of the battery, the power-drain map being usable by the wireless communication device to modify a communication behavior to reduce consumption of remaining battery power.

2. The wireless communication device of claim 1, wherein the power-drain map comprises associated measured power drains and geographical locations for each of a plurality of communication modes usable by the wireless communication device.

3. The wireless communication device of claim 1, wherein the power-drain map omits the power drains and the geographical locations for a communication mode that is disabled.

4. The wireless communication device of claim 1, wherein the measurement of the power drain includes the measurement of one or more of a power drain per unit time, a power drain per unit data during transmission, or a power drain per unit data during reception.

5. The wireless communication device of claim 1, wherein the location sensor is a Global Positioning System module.

6. The wireless communication device of claim 1, further comprising a Wi-Fi communication interface, and wherein the determination of the current geographical location employs Wi-Fi localization to identify the current geographical location.

7. The wireless communication device of claim 1, further comprising an orientation sensor, and the instructions executable to configure the wireless communication device to measure one or more of a device orientation relative to the earth, or a device orientation relative to a user.

8. A system for modifying a communication behavior of a wireless communication device, the system comprising:
   a location module;
   a processor; and
   a memory comprising instructions for modifying the communication behavior of the wireless communication device, the instructions executable by the processor to configure the system to:
      determine, using the location module, a current geographical location and at least one predicted future geographical location of the wireless communication device;
      determine, based on a power-drain map, the power-drain map including information associated with a power-drain model for increasing drain of a battery of the wireless communication device, a power-drain condition associated with one or more available communication modes at each of the current geographical location, and the at least one predicted future geographical location; and
      based at least in part on the determined power drains associated with the one or more available communication modes at each of the current geographical location and the at least one predicted future geographical location, modify the communication behavior of the wireless communication device to reduce consumption of remaining battery power of the wireless communication device using the model for the increasing drain of the battery.

9. The system of claim 8, the instructions executable by the processor to further configure the system to create the power-drain map.

10. The system of claim 8, wherein the power-drain map is received from a map server.

11. The system of claim 8, wherein the modification of the communication behavior includes: altering an interval of scanning for communication modes available to the wireless communication device, turning roaming off, disabling switching of communications modes, switching to a different communication mode, altering public land mobile network preference thresholds, turning off data reception, preemptively downloading data, delaying a data communication, turning on airplane mode, and advising a user to change at least one of device orientation, position, and grip.

12. The system of claim 8, wherein the modification of the communication behavior is based, at least in part, on a current battery-charge level of the wireless communication device.

13. The system of claim 8, wherein the determination of the at least one predicted future geographical location of the wireless communication device is based, at least in part, on one or more of: a current location of the wireless communication device, a current direction of movement of the wireless communication device, a geographical map, observations of past behavior of the wireless communication device, observations of past behavior of a user of the wireless communication device, stored preferences, observations of a plurality of wireless communication devices, observations of a plurality of users of wireless communication devices, a time of day, or a current weather condition.

14. The system of claim 8, wherein the determination of the at least one predicted future geographical location of the wireless communication device is performed on a device remote from the wireless communication device.

15. The system of claim 8, wherein the power-drain model for increasing drain of the battery of the wireless communication device assumes a linear discharge of the battery with increasing drain.

16. The system of claim 8, wherein the power-drain model for increasing drain of the battery of the wireless communication device assumes increasing resistive losses with increasing drain.

17. A map server comprising:
   a processor; and
   memory comprising instructions that configure the map server to modify a communication behavior of a wireless communication device, the instructions executable to configure the map server to:
      receive a report of a current geographical location of the wireless communication device;
      predict a future location of the wireless communication device;
      read a power-drain map to obtain power-drain data associated with the current geographical location and the future location of the wireless communication device, the power-drain data for each location reflecting a wireless connectivity power cost for each of one or more communication modes available at that location and including information associated with a power-drain model for increasing drain of a battery of the wireless communication device; and
      based at least in part on the obtained power-drain data, select a course of action regarding behavior of the wireless communication device with respect to wireless communication, the course of action including modifying the communication behavior of the wireless communication device, using the model for the increasing drain of the battery, to reduce consumption of remaining battery power of the wireless communication device.

18. The map server of claim 17, wherein the course of action regarding behavior of the wireless communication device with respect to wireless communication includes:

preemptively downloading data to the wireless communication device, instructing the wireless communication device to advise a user to change at least one of device orientation, position, and grip, or suggest to the wireless communication device one of: altering its interval of scanning for usable communication modes, turning roaming off or on, disabling switching of communications modes, switching to a different communication mode, altering its public land mobile network preference thresholds, turning off data reception, or turning on airplane mode.

19. The map server of claim 17, wherein the selection of the course of action regarding behavior of the wireless communication device with respect to wireless communication is based, at least in part, on a current battery-charge level reported by the wireless communication device.

20. The map server of claim 17, wherein predicting the future location of the wireless communication device uses one or more of: a current location of the wireless communication device, a current direction of movement of the wireless communication device, a geographical map, observations of past behavior of the wireless communication device, observations of past behavior of a user of the wireless communication device, stored preferences, observations of a plurality of wireless communication devices, observations of a plurality of users of wireless communication devices, a time of day, or a current weather condition.

* * * * *